(12) United States Patent
Takahashi et al.

(10) Patent No.: US 9,078,261 B2
(45) Date of Patent: Jul. 7, 2015

(54) MOBILE COMMUNICATION METHOD AND MOBILE STATION

(71) Applicant: NTT DOCOMO, INC., Tokyo (JP)

(72) Inventors: Hideaki Takahashi, Tokyo (JP); Yuta Sagae, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/345,665

(22) PCT Filed: Jan. 18, 2013

(86) PCT No.: PCT/JP2013/050952
§ 371 (c)(1),
(2) Date: Mar. 19, 2014

(87) PCT Pub. No.: WO2013/108881
PCT Pub. Date: Jul. 25, 2013

(65) Prior Publication Data
US 2014/0228041 A1    Aug. 14, 2014

(30) Foreign Application Priority Data

Jan. 18, 2012   (JP) .................................. 2012-008010

(51) Int. Cl.
*H04W 72/04*   (2009.01)
*H04W 48/10*   (2009.01)

(52) U.S. Cl.
CPC .......... *H04W 72/0453* (2013.01); *H04W 48/10* (2013.01)

(58) Field of Classification Search
CPC ..... H04W 24/10; H04W 24/02; H04W 48/12; H04W 48/10; H04W 72/0453

USPC ................................................... 455/450, 343
See application file for complete search history.

(56) References Cited

U.S. PATENT DOCUMENTS

| 2010/0317356 A1 | 12/2010 | Roessel et al. |
| 2011/0294536 A1 | 12/2011 | Ryu et al. |
| 2014/0148156 A1* | 5/2014 | Kubota et al. .................. 455/434 |

FOREIGN PATENT DOCUMENTS

| CN | 102293034 A | 12/2011 |
| EP | 2214441 A1 | 8/2010 |
| JP | 2012-5089 A | 1/2012 |

OTHER PUBLICATIONS

International Search Report for corresponding International Application No. PCT/JP2013/050952, mailed Feb. 19, 2013 (2 pages).
Written Opinion for corresponding International Application No. PCT/JP2013/050952, mailed Feb. 19, 2013 (3 pages).

(Continued)

*Primary Examiner* — Kashif Siddiqui
(74) *Attorney, Agent, or Firm* — Osha Liang LLP (57) ABSTRACT

The present invention notifies of an EARFCN in an equivalent band by means of an SIB 5 while minimizing the increase in overhead. A mobile communication method according to the present invention includes: a step in which a radio base station eNB in a cell #1 notifies, by means of the SIB 5, of a band #2 and an equivalent band #21 that can be supported in a cell #2 adjacent to the cell #1; and a step in which a mobile station UE assumes that access in the cell #2 is prohibited when having determined that the mobile station does not support the band #2 and the equivalent band #21.

2 Claims, 7 Drawing Sheets (56) References Cited

OTHER PUBLICATIONS

NTT DOCOMO, Inc.; "Analysis of RRC functions for supporting equivalent bands;" 3GPP TSG-RAN WG2 #76, R2-115746; San Francisco, USA; Nov. 14-18, 2011 (7 pages).
Ericsson et al.; "Support of multiple frequency bands in a cell;" 3GPP TSG-RAN WG2 #76, Tdoc R2-116082; San Francisco, US; Nov. 14-18, 2011 (2 pages).
Renesas Mobile Europe Ltd; "Mobility to Neighbour Cells Supporting Multiple Bands;" 3GPP TSG-RAN WG2 Meeting #76, R2-116075; San Francisco, USA; Nov. 14-18, 2011 (3 pages).
Samsung; "Introducing support for multi-bands cells;" 3GPP TSG-RAN2#76 meeting, Tdoc R2-116170 (Same as R2-115286); San Francisco, U.S.; Nov. 14-18, 2011 (2 pages).
Ericsson et al.; "Support of multiple frequency bands in a cell;" 3GPP TSG-RAN2 Meeting #76, R2-116083; San Francisco, US; Nov. 14-18, 2011 (9 pages).
Ericsson et al.; "Multiple frequency band indicators per cell;" 3GPP TSG-RAN2 Meeting #76, R2-115911; San Francisco, USA; Nov. 14-18, 2011 (45 pages).
Office Action in counterpart Chinese Patent Application No. 201380002389.7, mailed Sep. 15, 2014 (9 pages).
Extended Search Report issued in corresponding European Application No. 13738227.1, mailed Feb. 19, 2015 (8 pp.).
Office Action issued in corresponding Chinese Application No. 201380002389.7, mailed Feb. 12, 2015 (12 pp.) X.

\* cited by examiner

SystemInformationBlockType1 message

```
-- ASN1START

SystemInformationBlockType1 ::=    SEQUENCE {
...
    freqBandIndicator           INTEGER (1..64),
...
}

SystemInformationBlockType1-v920-IEs ::=  SEQUENCE {
    ims-EmergencySupport-r9         ENUMERATED {true}          OPTIONAL,  -- Need OR
    cellSelectionInfo-v920          CellSelectionInfo-v920     OPTIONAL,  -- Cond RSRQ
    nonCriticalExtension            SystemInformationBlockType1-v11xy-IEs
OPTIONAL
}

SystemInformationBlockType1-v11xy-IEs ::= SEQUENCE {
    addiFreqBandIndicatorList-r11
        SEQUENCE (SIZE (1..maxMultiBands-r11) OF INTEGER (1..64)    OPTIONAL,   -- Need OP
OR
    nonCriticalExtension        SEQUENCE {}                OPTIONAL,           -- Need OP
}
...
-- ASN1START
```

| SystemInformationBlockType1 field descriptions |
|---|
| addiFreqBandIndicatorList<br>Indicates a list of additional frequency band indicators as defined in TS 36.101 [42, table 5.5-1] that the cell belongs to. |
| freqBandIndicator<br>Defined in TS 36.101[42,table 5.5-1]. |

FIG. 4

SystemInformationBlockType2 information element

```
-- ASN1START

SystemInformationBlockType2 ::=    SEQUENCE {
    ...
    [[ ac-BarringForCSFB-r10           AC-BarringConfig         OPTIONAL     -- Need OP
    ]],
    [[ addiFreqInfoList-r11            SEQUENCE (SIZE (1..maxMultiBands-r11)) OF AddiFreqInfo-r11
    OPTIONAL      -- Need OR
    ]]
}
...
AddiFreqInfo-r11 ::=    SEQUENCE {
    ul-CarrierFreq                     ARFCN-ValueEUTRA         OPTIONAL,    -- Need OP
    additionalSpectrumEmission         AdditionalSpectrumEmission
}

-- ASN1STOP
```

SystemInformationBlockType2 field descriptions

...

*addiFreqInfoList*
One entry indicates the frequency information i.e. ul-CarrierFreq and additionalSpectrumEmission corresponding to the frequency band in the same order as listed in *addiFreqBandIndicatorList*.

FIG. 5

SystemInformationBlockType5 information element

```
-- ASN1START

SystemInformationBlockType5 ::=     SEQUENCE {
    interFreqCarrierFreqList            InterFreqCarrierFreqList,
    ...,
    lateNonCriticalExtension            OCTET STRING                                    OPTIONAL,   -- Need OP
    [[ addiInterFreqCarrierFreqList-r11     SEQUENCE (SIZE (1..maxMultiBands-r11)) OF
InterFreqCarrierFreqList    OPTIONAL     -- Need OR
    ]]
}

InterFreqCarrierFreqList ::=     SEQUENCE (SIZE (1..maxFreq)) OF InterFreqCarrierFreqInfo InterFreqCarrierFreqInfo ::=     SEQUENCE {
    dl-CarrierFreq                  ARFCN-ValueEUTRA,
    ...
    [[ addiFreqBandIndicatorList-r11     SEQUENCE (SIZE (1..maxMultiBands-r11) OF INTEGER (1..64)
OPTIONAL     -- Need OR
    ]]
}

InterFreqNeighCellList ::=     SEQUENCE (SIZE (1..maxCellInter)) OF InterFreqNeighCellInfo InterFreqNeighCellInfo ::=     SEQUENCE {
    physCellId                      PhysCellId,
    q-OffsetCell                    Q-OffsetRange
}

InterFreqBlackCellList ::=     SEQUENCE (SIZE (1..maxCellBlack)) OF PhysCellIdRange

-- ASN1START
```

SystemInformationBlockType5 field descriptions

*addiInterFreqCarrierFreqList*
Indicates the information for inter-frequency cell re-selection on the extension part of additional frequency bands in the same order as listed in *addiFreqBandIndicatorList* in *SystemInformationBlockType1*. This information for inter-frequency cell re-selection is only applicable for UEs that support the frequency band(s) as included in *addiFreqBandIndicatorList* in *SystemInformationBlockType1*.

*addiFreqBandIndicatorList*
Indicates the list of additional frequency bands that the inter-frequency neighbour cells belong to.

*SystemInformationBlockType5 information element*

```
-- ASN1START
SystemInformationBlockType5 ::=     SEQUENCE {
    interFreqCarrierFreqList        InterFreqCarrierFreqList,
    ...,
    lateNonCriticalExtension        OCTET STRING            OPTIONAL-- Need OP }
InterFreqCarrierFreqList ::=    SEQUENCE (SIZE (1..maxFreq)) OF InterFreqCarrierFreqInfo
InterFreqCarrierFreqInfo ::= SEQUENCE {
    dl-CarrierFreq                  ARFCN-ValueEUTRA,
    q-RxLevMin                      Q-RxLevMin,
    p-Max                           P-Max                   OPTIONAL,       -- Need OP
    t-ReselectionEUTRA              T-Reselection,
    t-ReselectionEUTRA-SF           SpeedStateScaleFactors  OPTIONAL,       -- Need OP
    threshX-High                    ReselectionThreshold,
    threshX-Low                     ReselectionThreshold,
    allowedMeasBandwidth            AllowedMeasBandwidth,
    presenceAntennaPort1            PresenceAntennaPort1,
    cellReselectionPriority         CellReselectionPriority OPTIONAL,       -- Need OP
    neighCellConfig                 NeighCellConfig,
    q-OffsetFreq                    Q-OffsetRange           DEFAULT dB0,
    interFreqNeighCellList          InterFreqNeighCellList  OPTIONAL,       -- Need OR
    interFreqBlackCellList          InterFreqBlackCellList  OPTIONAL,       -- Need OR
    ...,
    [[ q-QualMin-r9                 Q-QualMin-r9            OPTIONAL,       -- Need OP
       threshX-Q-r9                 SEQUENCE {
           threshX-HighQ-r9             ReselectionThresholdQ-r9,
           threshX-LowQ-r9              ReselectionThresholdQ-r9
       }                                                    OPTIONAL        -- Cond RSRQ
    ]],
    [[ InterFreqNeighCellList-r11   InterFreqNeighCellList-rr   OPTIONAL,   -- Need OR
    ]]
}
InterFreqNeighCellList ::=      SEQUENCE (SIZE (1..maxCellInter)) OF InterFreqNeighCellInfo
InterFreqNeighCellInfo ::=      SEQUENCE {
    physCellId                      PhysCellId,
    q-OffsetCell                    Q-OffsetRange
}
InterFreqBlackCellList ::=      SEQUENCE (SIZE (1..maxCellBlack)) OF PhysCellIdRange
InterFreqNeighCellList-11 ::=           SEQUENCE (SIZE (1..maxCellInter-r11)) OF InterFreqNeighCellInfo-r11
InterFreqNeighCellInfo-r11 ::=          SEQUENCE {
    physCellId                          PhysCellId,
    q-OffsetCell                        Q-OffsetRange,
    addiFreqBandIndicatorList-r11
                        SEQUENCE (SIZE (1..maxAddiFBI-r11) OF INTEGER (1..64)
}
-- ASN1START
```

MOBILE COMMUNICATION METHOD AND MOBILE STATION

TECHNICAL FIELD

The present invention relates to a mobile communication method and a mobile station.

BACKGROUND ART

Each cell in an LTE (Long Term Evolution) scheme is configured to support a single band (a frequency band).

On the other hand, a mobile station UE is configured to be able to perform connection processing only in a cell that supports a band supported by the mobile station itself (or a band that has passed an authentication test).

That is, the mobile station UE is configured to not be able to perform the connection processing in a cell that does not support the band supported by the mobile station itself (or the band that has passed the authentication test).

Moreover, an "equivalent band" can be applied in an LTE scheme. Each cell can support a plurality of bands by applying the equivalent band.

Here, a band is configured to overlap with an equivalent band of that band.

Furthermore, a radio base station eNB in the LTE scheme is configured to notify of a target EARFCN (E-UTRA Absolute Radio Frequency Channel Number) for inter-frequency measurement to perform a cell reselection process, by means of an information element "InterFreqCarrierFreqInfo" included in an SIB (System Information Block) 5.

CITATION LIST

Non-Patent Literature

Non-Patent Literature 1: 3GPP Contribution R2-115746
Non-Patent Literature 2: 3GPP Contribution R2-116082
Non-Patent Literature 3: 3GPP Contribution R2-116075
Non-Patent Literature 4: 3GPP Contribution R2-116170
Non-Patent Literature 5: 3GPP Contribution R2-116083
Non-Patent Literature 6: 3GPP Contribution R2-115911

SUMMARY OF INVENTION

The maximum number of information elements "InterFreqCarrierFreqInfo" that can be set within an information element "InterFreqCarrierFreqList" is eight, according to the specification of the existing LTE scheme.

There is however assumed a case where the number of information elements "InterFreqCarrierFreqInfo" that can be set within the information element "InterFreqCarrierFreqList" exceeds eight when each cell supports the plurality of bands by applying the "equivalent band" as described above.

In such case, it is not preferred to increase the number of information elements "InterFregCarrierFreqInfo" that can be set within the information element "InterFreqCarrierFreqList" in terms of an increase in overhead.

The present invention has been provided in consideration of the aforementioned problem. An object of the present invention is to provide a mobile station and a mobile communication method by which the SIB 5 can notify of an EARFCN of an equivalent band while minimizing the increase in the overhead.

A first characteristic of the present invention is the mobile communication method including: a step in which a radio base station in a first cell notifies, by means of broadcast information, of a radio frequency channel number within a band supported in a second cell adjacent to the first cell as well as an equivalent band of the band; and a step in which a mobile station assumes that access in the second cell is prohibited when having determined that the mobile station does not support the band and the equivalent band.

The second characteristic of the present invention is the mobile station including: a reception unit which receives the broadcast information from the radio base station in the first cell, the broadcast information notifying of the band supported in the second cell adjacent to the first cell as well as the equivalent band of the band; and a determination unit which is configured to assume that access in the second cell is prohibited when having determined that the mobile station does not support the band and the equivalent band.

BRIEF DESCRIPTION OF DRAWINGS

FIG. 8 is a diagram illustrating an example of a format of an SIB 5 broadcast by a radio base station according to Modified Example 1 of the present invention.

DESCRIPTION OF EMBODIMENT (Mobile Communication System According to First Embodiment of the Present Invention)

A mobile communication system according to a first embodiment of the present invention will be described with reference to FIGS. 1 to 7. In all figures provided to describe the present embodiment, a component having the same function is assigned the same reference numeral so that redundant description of such component will be omitted.

Figure 1:
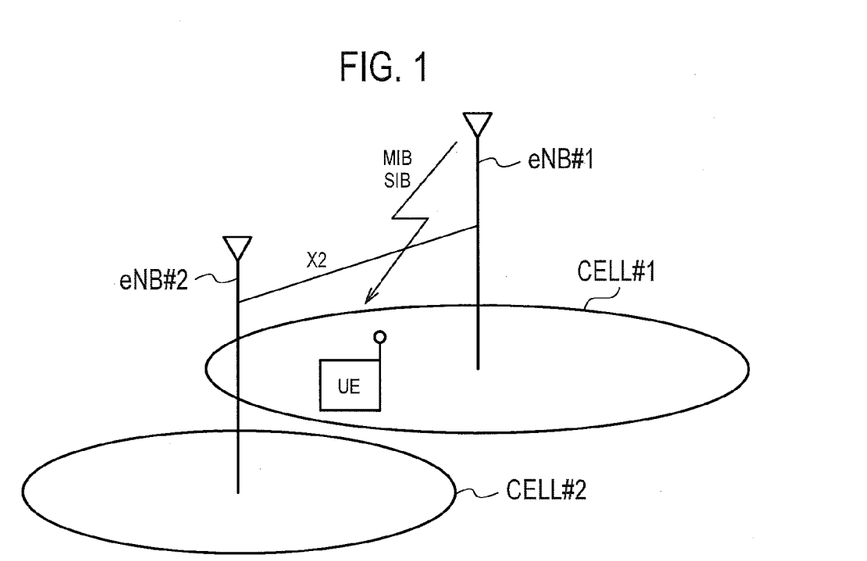
FIG. 1 is an overall configuration diagram illustrating a mobile communication system according to a first embodiment of the present invention.

As illustrated in FIG. 1, the mobile communication system according to the present embodiment includes a radio base station eNB#1 and a radio base station eNB#2.

The radio base station eNB#1 manages a cell #1 while the radio base station eNB#2 is configured to manage a cell #2. The radio base station eNB#1 and the radio base station eNB#2 are connected to each other by an X2 interface.

Here, the cell #1 supports a band #19 as well as bands #5/#26 as equivalent bands, whereas the cell #2 supports a band #2 as well as a band #21 as an equivalent band.

The band #5 and the bands #19/#26 are configured to overlap one another while the band #2 and the band #21 are configured to overlap each other, but the bands #5/#19/#26 are not configured to overlap with the bands #2/#21.

Note that in the present embodiment, a mobile station UE is in a standby state in the cell #1 subordinate to the radio base station eNB#1.

The configurations of the radio base station eNB#1 and the radio base station eNB #2 being fundamentally the same, the configuration of the radio base station eNB#1 will be described below as a representative configuration.

Figure 2:
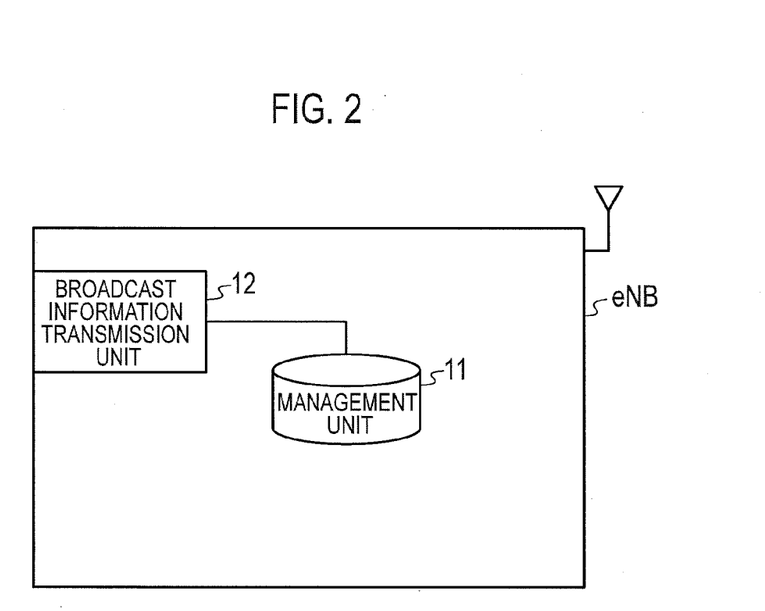
FIG. 2 is a functional block diagram illustrating a radio base station according to the first embodiment of the present invention.

As illustrated in FIG. 2, the radio base station eNB#1 includes a management unit 11 and a broadcast information transmission unit 12.

The management unit 11 is configured to manage a band configuration used in the radio base station eNB#1 (or the cell #1).

The management unit 11 may also be configured to manage a band configuration used in the radio base station eNB #2 (or the cell #2) adjacent to the radio base station eNB#1.

The broadcast information transmission unit 12 is configured to transmit broadcast information such as an MIB (Master Information Block) and SIBs 1 to 8 in the cell #1.

Figure 3:
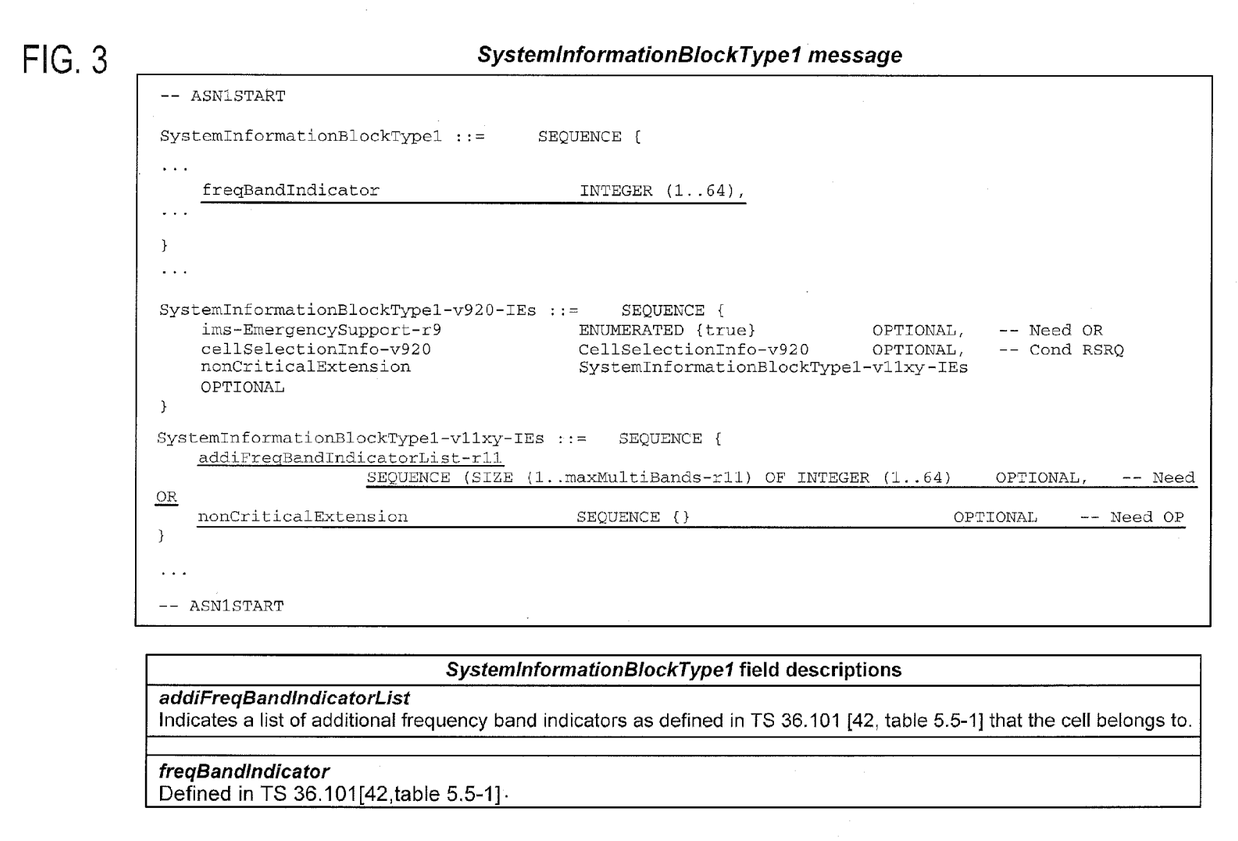
FIG. 3 is a diagram illustrating an example of a format of an SIB 1 broadcast by the radio base station according to the first embodiment of the present invention.

For example, the broadcast information transmission unit 12 is configured to refer to the band configuration managed by the management unit 11 to notify of the band #5 supported in the cell #1 by means of an information element "freqBand-Indicator" included in the SIB 1 and notify of the bands (hereinafter referred to as equivalent bands) #5/#26 supported in the cell #1 as equivalent bands, by means of an information element "addiFreqBandIndicatorList" included in the SIB 1 as illustrated in FIG. 3.

Figure 4:
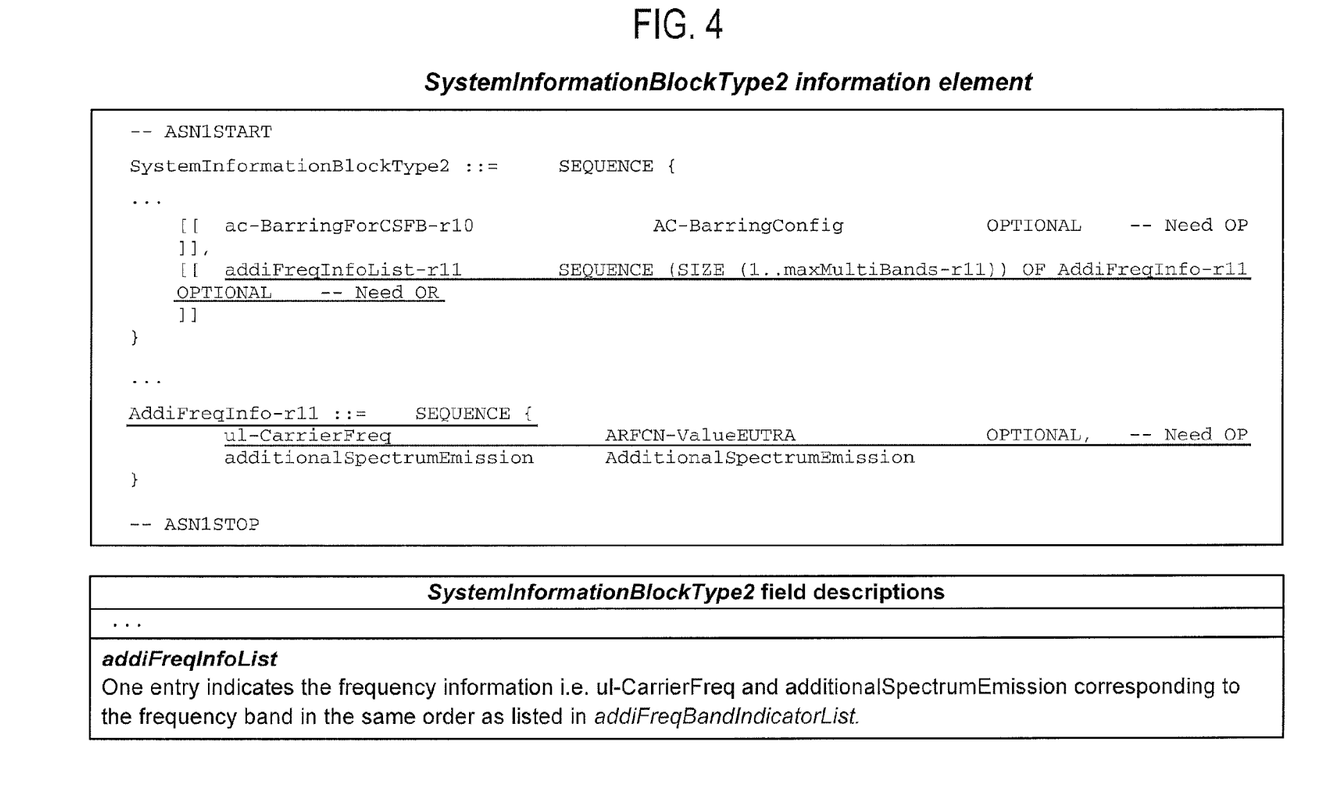
FIG. 4 is a diagram illustrating an example of a format of an SIB 2 broadcast by the radio base station according to the first embodiment of the present invention.

The broadcast information transmission unit 12 is further configured to refer to the band configuration managed by the management unit 11 to notify of carrier frequency information pertaining to the equivalent bands #5/#26 supported in the cell #1, by means of an information element "addiFreqInfoList" included in the SIB 2 as illustrated in FIG. 4.

Figure 5:
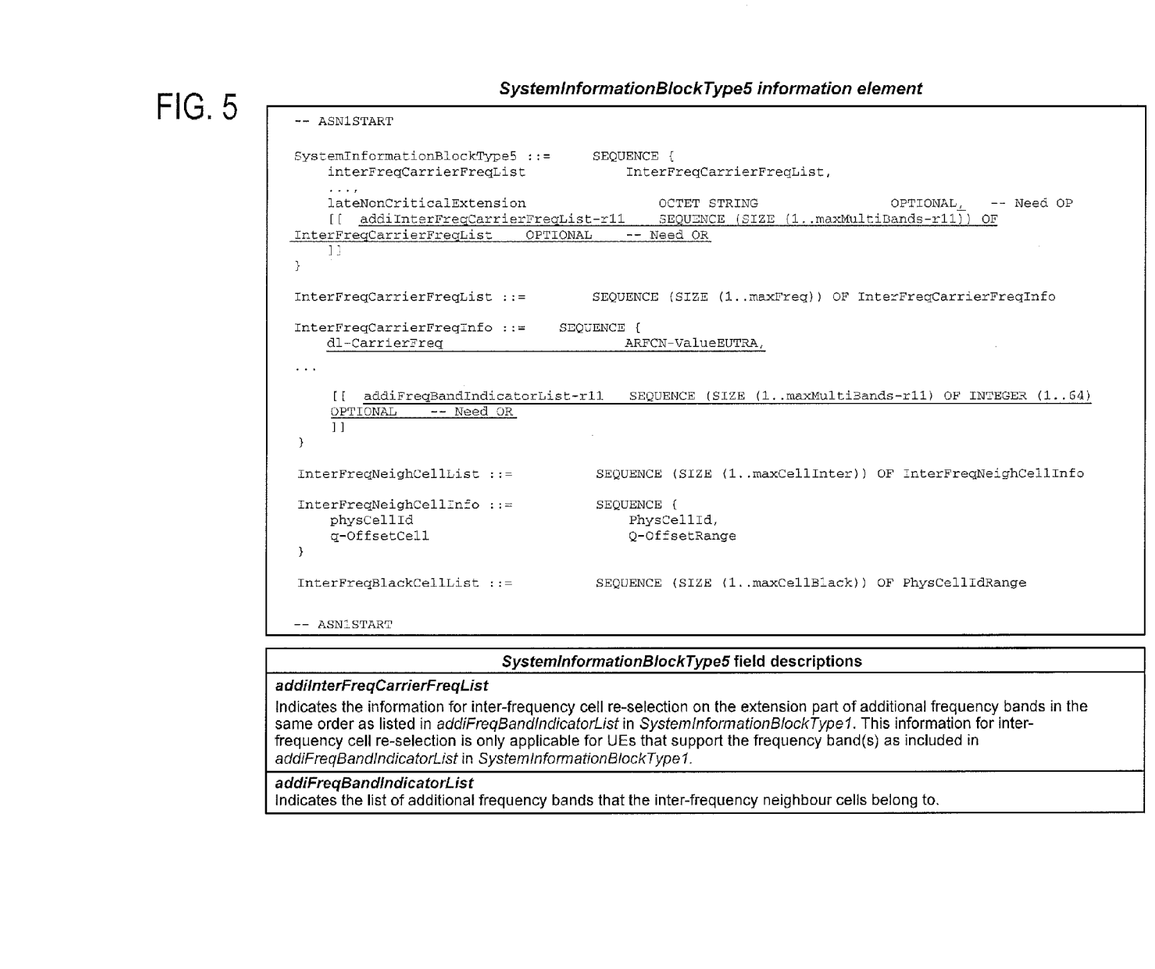
FIG. 5 is a diagram illustrating an example of a format of an SIB 5 broadcast by the radio base station according to the first embodiment of the present invention.

Furthermore, the broadcast information transmission unit 12 is configured to refer to the band configuration managed by the management unit 11 to notify of a target EARFCN for the inter-frequency measurement provided to perform a cell reselection process within the band #2 supported in the cell #2, by means of an information element "dl-CarrierFreq" within an information element "InterFreqCarrierFreqInfo" included in the SIB 5 as illustrated in FIG. 5.

Furthermore, the broadcast information transmission unit 12 is configured to refer to the band configuration managed by the management unit 11 to notify of the equivalent band #21 supported in the cell #2, by means of an information element "addiFreqBandIndicatorList" within the information element "InterFreqCarrierFreqInfo" included in the SIB 5 as illustrated in FIG. 5.

Figure 6:
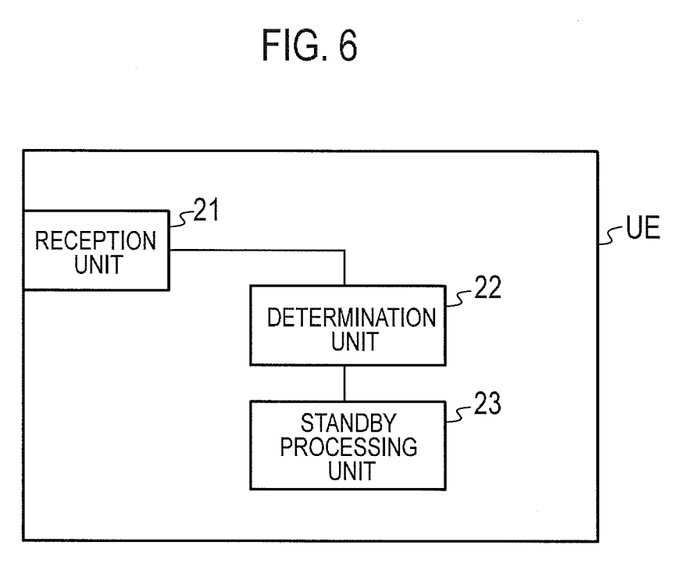
FIG. 6 is a functional block diagram illustrating a mobile station according to the first embodiment of the present invention.

The mobile station UE according to the present embodiment includes a reception unit 21, a determination unit 22, and a standby processing unit 23 as illustrated in FIG. 6.

The reception unit 21 is configured to receive the broadcast information (such as the MIB and the SIBs 1 to 8) transmitted by the radio base station eNB#1.

Here, the reception unit 21 is configured to acquire information related to the band #19 and the equivalent bands #5/#26 that are supported in the cell #1, from the SIB 1.

The reception unit 21 is also configured to acquire uplink carrier frequency information related to the band #19 and the equivalent bands #5/#26 that are supported in the cell #1, from the SIB 2.

Moreover, the reception unit 21 is configured to acquire information related to the band #2 and the equivalent band #21 that are supported in the cell #2, from the SIB 5.

The determination unit 22 is configured to determine whether or not the band #19 and the equivalent bands #5/#26 supported in the cell #1 and received by the reception unit are supported by the mobile station UE.

The determination unit 22 is configured to assume that access is prohibited in the cell #1 when having determined that the mobile station UE does not support the band #19 and the equivalent bands #5/#26 supported in the cell #1.

The determination unit 22 is also configured to determine whether or not the band #2 and the equivalent bands #21 supported in the cell #2 and received by the reception unit are supported by the mobile station UE.

The determination unit 22 is configured to assume that access in the cell #2 is prohibited when having determined that the mobile station UE does not support the band #2 and the equivalent band #21 supported in the cell #2.

The standby processing unit 23 is configured to perform a standby process on the basis of the determination result made by the determination unit 22.

That is, the standby processing unit 23 is configured to search for a cell with a different frequency without performing the standby process in a cell regarded by the determination unit 22 as the cell to which access is prohibited (a barred cell).

An example of an operation of the mobile station UE according to the present embodiment will be described below with reference to FIG. 7.

Figure 7:
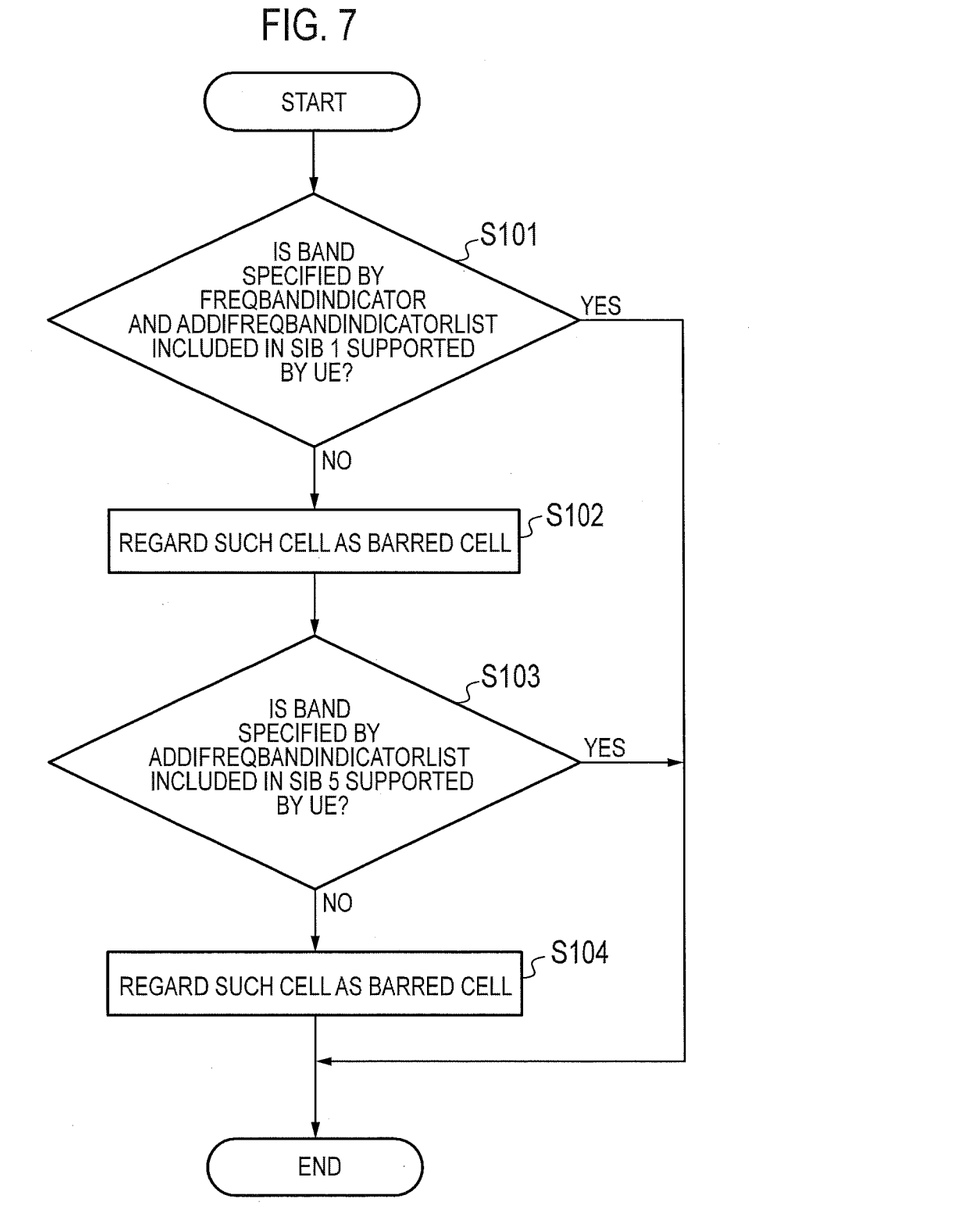
FIG. 7 is a flowchart illustrating an operation of the mobile station according to the first embodiment of the present invention.

As illustrated in FIG. 7, the mobile station UE that is on standby in the cell #1 determines, in step S101, whether or not the band specified by the information elements "freqBand-Indicator" and "addiFreqBandIndicatorList" included in the SIB 1 received in the cell #1 is supported by the mobile station UE.

The mobile station UE continues to be on standby in the cell #1 and ends the present operation when the determination is "YES".

When the determination is "NO", on the other hand, the present operation proceeds to step S102 where the mobile station UE assumes that access to the cell #1 is prohibited.

In step S103, the mobile station UE determines whether or not the band corresponding to the EARFCN specified by the information element "dl-CarrierFreq" included in the SIB 5 received in the cell #1 as well as the band specified by the information element "addiFreqBandIndicatorList" are supported by the mobile station UE.

The mobile station UE here performs this determination on all bands included in the information element "addiFreqBandIndicatorList".

The mobile station UE performs the cell reselection process on a cell #1 and ends the present operation when the determination is "YES".

When the determination is "NO", on the other hand, the present operation proceeds to step S104 where the mobile station UE assumes that access to the cell #1 is prohibited and searches for a cell with a different frequency.

According to the mobile communication system in the first embodiment of the present invention, the mobile station UE can properly perform the inter-frequency measurement to perform the cell reselection process without increasing the number of information elements "InterFregCarrierFreqInfo" that can be set within the information element "InterFreqCarrierFreqList" included in the SIB 5, even when each cell can support a plurality of bands by applying the "equivalent band".

Modified Example 1

Now, a mobile communication system according to Modified Example 1 of the present invention will be described with reference to FIG. 8 while focusing on what is different from the mobile communication system according to the first embodiment described above.

In Modified Example 1, a broadcast information transmission unit 12 in a radio base station eNB is configured to refer to a band configuration managed by a management unit 11 to notify of an equivalent band supported in each cell adjacent to a cell #1, by means of an information element "InterFreqNeighCellList" within an information element "InterFreqCarrierFreqInfo" included in an SIB 5 as illustrated in FIG. 8.

The mobile communication system according to Modified Example 1 can notify of a different equivalent band for each cell even when each cell adjacent to the cell #1 supports a different equivalent band.

The aforementioned characteristic of the present embodiment may also be expressed as follows.

A first characteristic of the present embodiment is a mobile communication method including: a step in which the radio base station eNB in the cell #1 (a first cell) notifies, by means of the SIB 5 (broadcast information), of the band #2 (a band) and the equivalent band #21 (an equivalent band) that can be supported in the cell #2 (a second cell) adjacent to the cell #1; and a step in which the mobile station UE assumes that access in the cell #2 is prohibited when having determined that the mobile station supports neither the band #2 nor the equivalent band #21.

A second characteristic of the present embodiment is the mobile station UE including: the reception unit 21 which is configured to receive the SIB 5 from the radio base station eNB in the cell #1, the SIB 5 notifying of the band #2 and the equivalent band #21 that can be supported in the cell #2; and the determination unit 22 which is configured to assume that access in the cell #2 is prohibited when having determined that the mobile station does not support the band #2 and the equivalent band #21.

Note that the operation of the radio base station eNB and the mobile station UE described above may be implemented by hardware, a software module executed by a processor, or a combination of the both.

The software module may be provided in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read/write information from/to the storage medium. The storage medium may also be integrated into the processor. The storage medium and the processor may be provided in an ASIC, which may be provided in the radio base station eNB and the mobile station UE. Moreover, the storage medium and the processor may be provided in the radio base station eNB and the mobile station UE as a discrete component.

While the present invention has been described in detail by using the aforementioned embodiments, it is apparent for those skilled in the art that the present invention is not limited to the embodiments described herein. The present invention can be implemented as revisions and modified aspects without departing from the spirit and the scope of the present invention provided by the description of claims. Accordingly, the description herein is provided for the purpose of illustration and not intended to have any restrictive meaning to the present invention.

Note that the entire content of Japanese Patent Application No. 2012-008010 (filed on Jan. 18, 2012) is herein incorporated by reference.

INDUSTRIAL APPLICABILITY

As described above, the present invention can provide the mobile station and the mobile communication method by which the EARFCN of the equivalent band can be notified by means of the SIB 5 while minimizing the increase in overhead.

REFERENCE SIGNS LIST eNB radio base station
11 management unit
12 broadcast information transmission unit
UE mobile station
21 reception unit
22 determination unit
23 standby processing unit

The invention claimed is:
1. A mobile communication method comprising a step in which a radio base station in a first cell notifies a mobile station, by means of broadcast information, of an E-UTRA Absolute Radio Frequency Channel Number (EARFCN) corresponding to a frequency band that can be supported in a second cell adjacent to the first cell as well as band information overlapping with a frequency band corresponding to the EARFCN, and
    wherein the radio base station notifies the mobile station of the EARFCN as well as the band information by using an information element "InterFreqCarrierFreqInfo" of System Information Block (SIB) 5.
2. A mobile station comprising a reception unit which is configured to receive broadcast information from a radio base station in a first cell, the broadcast information notifying the mobile station of an E-UTRA Absolute Radio Frequency Channel Number (EARFCN) corresponding to a frequency band that can be supported in a second cell adjacent to the first cell as well as band information overlapping with a frequency band corresponding to the EARFCN, and
    wherein the mobile station receives the EARFCN as well as the band information by using an information element "InterFreqCarrierFreqInfo" of System Information Block (SIB) 5.

* * * * *